United States Patent
Dalela et al.

(10) Patent No.: US 8,964,641 B2
(45) Date of Patent: Feb. 24, 2015

(54) SYSTEM AND METHOD FOR TRANSPORTING DIGITAL BASEBAND STREAMS IN A NETWORK ENVIRONMENT

(75) Inventors: Ashish Dalela, Bangalore (IN); Michael P. Hammer, Herndon, VA (US); Kevin D. Shatzkamer, Hingham, MA (US); Monique J. Morrow, Zurich (CH); Peter Christian Tomsu, Leitzersdorf (AT); Vojislav Vucetic, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 13/492,897

(22) Filed: Jun. 10, 2012

(65) Prior Publication Data
US 2013/0329633 A1    Dec. 12, 2013

(51) Int. Cl.
*H04L 29/02*    (2006.01)
*H04W 92/00*    (2009.01)

(52) U.S. Cl.
CPC ..................................... *H04L 29/02* (2013.01)
USPC ......................................................... 370/328

(58) Field of Classification Search
CPC .............. H04L 63/0428; H04L 69/166; H04L 2212/0025; H04L 2012/5652; H04L 29/02; H04W 28/065; H04W 92/00
USPC ........................................................ 370/328
See application file for complete search history.

(56) References Cited

U.S. PATENT DOCUMENTS

| | | | |
|---|---|---|---|
| 6,018,521 A * | 1/2000 | Timbs et al. | .................. 370/342 |
| 6,430,193 B1 | 8/2002 | Raissinia et al. | |
| 6,577,642 B1 | 6/2003 | Fijolek et al. | |
| 7,321,571 B2 | 1/2008 | Schnack et al. | |
| 7,602,751 B2 | 10/2009 | Ebert et al. | |
| 7,688,835 B2 | 3/2010 | Kotzin et al. | |
| 8,014,325 B2 | 9/2011 | Izumikawa et al. | |
| 8,018,910 B2 | 9/2011 | Jiang et al. | |
| 8,134,979 B2 | 3/2012 | Jin et al. | |
| 8,160,019 B2 | 4/2012 | Labedz | |
| 8,213,993 B2 | 7/2012 | Nino et al. | |
| 8,358,577 B1 | 1/2013 | Khanka et al. | |
| 8,422,884 B2 | 4/2013 | Mae | |
| 8,670,772 B2 | 3/2014 | Roddy et al. | |

(Continued)

OTHER PUBLICATIONS

U.S. Appl. No. 13/336,167, entitled "System and Method for Transporting Digital Radio Signal Streams in a Small Cell Network Environment," filed Dec. 23, 2011; Inventors: Kevin Shatzkamer, et al.

(Continued)

*Primary Examiner* — Melvin Marcelo
*Assistant Examiner* — Ellen A Kirillova
(74) *Attorney, Agent, or Firm* — Patent Capital Group (57) ABSTRACT

A method is provided in example embodiments that include receiving a radio signal stream and segmenting the radio signal stream into segments. The segments may be packetized and transported in packets over a pseudowire in a packet-switched network. The radio signal stream can be reconstructed from the segments. In more particular embodiments, the pseudowire may be a multi-protocol label switching pseudowire or a layer 2 tunneling protocol pseudowire, for example. In yet other specific example embodiments, the radio signal stream may be received using a common public radio interface or a femtocell application programming interface.

21 Claims, 5 Drawing Sheets

(56) References Cited

U.S. PATENT DOCUMENTS

| | | | |
|---|---|---|---|
| 2003/0035420 A1* | 2/2003 | Niu | 370/389 |
| 2005/0088012 A1 | 4/2005 | Yoshida | |
| 2005/0238049 A1* | 10/2005 | Delregno | 370/466 |
| 2007/0133477 A1 | 6/2007 | Ebert et al. | |
| 2008/0192773 A1 | 8/2008 | Ou et al. | |
| 2009/0059790 A1 | 3/2009 | Calvert et al. | |
| 2010/0074121 A1 | 3/2010 | Sakama | |
| 2010/0128676 A1 | 5/2010 | Wu et al. | |
| 2010/0131702 A1* | 5/2010 | Wong et al. | 711/103 |
| 2010/0234061 A1* | 9/2010 | Khandekar et al. | 455/522 |
| 2010/0239256 A1 | 9/2010 | Zheng | |
| 2010/0296469 A1 | 11/2010 | Zhou et al. | |
| 2011/0158332 A1 | 6/2011 | Wu et al. | |
| 2011/0201268 A1 | 8/2011 | He et al. | |
| 2011/0223962 A1 | 9/2011 | Kuwahara et al. | |
| 2011/0236024 A1 | 9/2011 | Mao | |
| 2011/0243071 A1 | 10/2011 | Wu et al. | |
| 2011/0255497 A1 | 10/2011 | Pan et al. | |
| 2011/0261812 A1* | 10/2011 | Kini et al. | 370/389 |
| 2011/0269405 A1 | 11/2011 | Bjorken | |
| 2012/0063314 A1* | 3/2012 | Pignataro et al. | 370/235 |
| 2013/0116011 A1* | 5/2013 | Lee et al. | 455/562.1 |

OTHER PUBLICATIONS

USPTO May 23, 2013 Non-Final Office Action from U.S. Appl. No. 13/336,167.

USPTO Aug. 22, 2013 Response to May 23, 2013 Non-Final Office Action from U.S. Appl. No. 13/336,167.

USPTO Dec. 31, 2013 Non-Final Office Action from U.S. Appl. No. 13/336,167.

Agilent Technologes, Inc., "Understanding the CPRI Digital Interface Standard," Feb. 6, 2006; 5 pages; http://www.agilent.com/about/newsroom/tmnews/background/2006/06feb2006_bg.html.

CPRI Specification V4.2: "Common Public Radio Interface (CPRI); Interface Specification," Sep. 29, 2010; © 2009 Ericsson AB, Huawei Technologies Co. Ltd., NEC Corporation, Alcatel Lucent, and Nokia Siemens Networks GmbH & Co. KG; 113 pages http://www.cpri.info/spec.html.

ITU-T J.222.1: "Series J: Cable Networks and Transmission of Television, Sound Programme and Other Multimedia Signals; Interactive Systems for Digital Televisions Distribution; Third-Generation Transmission Systems for Interactive Cable Televisions Services—IP Cable Modems: Physical Layer Specification," International Telecommunication Union; Jul. 2007, 184 pages.

ITU-T J.222.2: "Series J: Cable Networks and Transmission of Television, Sound Programme and Other Multimedia Signals; Interactive Systems for Digital Televisions Distribution; Third-Generation Transmission Systems for Interactive Cable Televisions Services—IP Cable Modems: MAC and Upper Layer Protocols; vol. 1: Core Recommendation," International Telecommunication Union; Jul. 2007, 435 pages.

USPTO May 8, 2014 Notice of Allowance from U.S. Appl. No. 13/336,167.

U.S. Appl. No. 14/318,107, filed Jun. 27, 2014, entitled "System and Method for Transporting Digital Radio Signal Streams in a Small Cell Network Environment ," Inventors: Kevin Shatzkamer, et al.

* cited by examiner

SYSTEM AND METHOD FOR TRANSPORTING DIGITAL BASEBAND STREAMS IN A NETWORK ENVIRONMENT

TECHNICAL FIELD

This disclosure relates in general to the field of communications and, more particularly, to a system and a method for transporting digital baseband data streams in a network environment.

BACKGROUND

Networking architectures have grown increasingly complex in communications environments, particularly mobile wireless environments. Network service providers also continue to steadily increasing their wireless service offerings to provide better coverage of specialized spaces. This includes the deployment and integration of WiMAX, WiFi, metrocells, microcells, picocells, and femtocells, for example, which can be linked to backhaul networks. However, many challenges remain in integrating fronthaul communications with backhaul networks: some of these challenges may include cost reduction, maintainability, and technological interworking.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes receiving a radio signal stream and segmenting the radio signal stream into segments (e.g., blocks of data, pieces of information, bits of data, etc.). The segments may be packetized and transported in packets over a pseudowire in a packet-switched network. The radio signal stream can be reconstructed from the segments. In more particular embodiments, the pseudowire may be a multi-protocol label switching pseudowire or a layer 2 tunneling protocol pseudowire, for example. In yet other specific example embodiments, the radio signal stream may be received using a common public radio interface or a femtocell application programming interface. In yet other embodiments, the method may include parsing a particular one of the segments for encapsulation into a packet payload. A control word is prepended to the particular one of the segments to identify an order in which the segments can be reassembled by a reconstructor provisioned along a downstream path in the packet-switched network.

Example Embodiments

Figure 1:
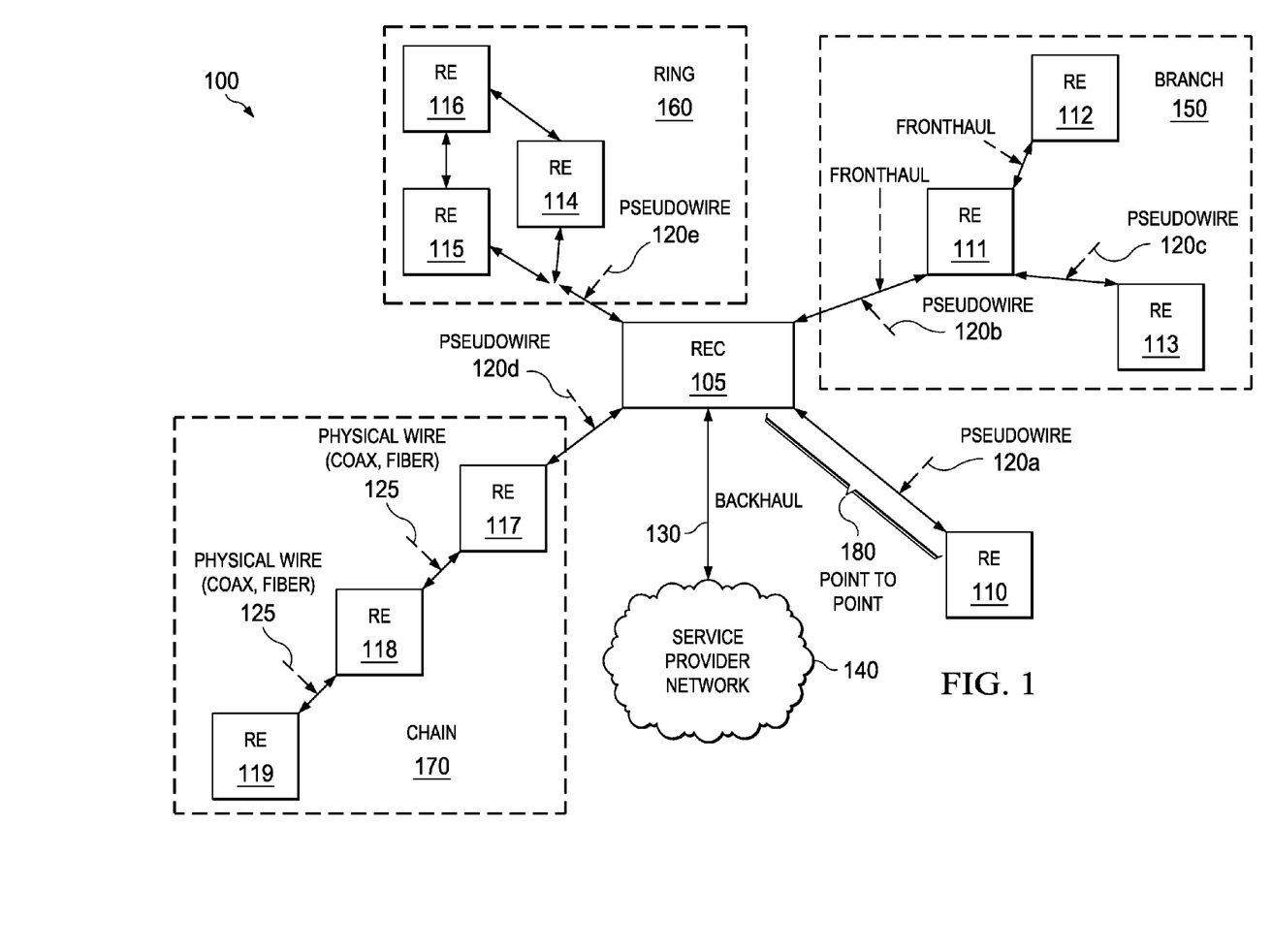
FIG. 1 is a simplified block diagram illustrating an example embodiment of a communication system in which a radio signal stream may be transported over a packet-switched network in accordance with this specification.

Turning to FIG. 1, FIG. 1 is a simplified block diagram of an example embodiment of a communication system 100 in which a radio signal may be transported over a packet-switched network in accordance with this specification. A radio equipment controller, such as radio equipment controller (REC) 105 may be connected to radio equipment, such as radio equipment (RE) 110-119 through pseudowire connections, such as pseudowires 120a-120e. A backhaul communication path 130 interconnects REC 105 with a service provider network 140. FIG. 1 further illustrates various topologies that may be associated with communication system 100, including a branch topology 150, a ring topology 160, a chain topology 170, and a point-to-point topology 180. In certain embodiments, REC 105 and REs 110-119 of communication system 100 may be representative of a fronthaul wireless network topology in a distributed antenna architecture (DAA) in which REC 105 may control the operation of antennas (e.g., REs 110-119) in such an architecture.

Before detailing the operations and the infrastructure of FIG. 1, certain contextual information is provided to offer an overview of the types of communications traversing communication system 100. Such information is offered earnestly and for teaching purposes only and, therefore, should not be construed in any way to limit the broad applications for the present disclosure. In some wireless communication environments, specialized deployments may be needed to meet customer coverage requirements. For example, indoor spaces may not be conducive to radio transmission, or a full macro-cell deployment may not be economically justifiable in less populated areas. Other mobile ad hoc networks (MANETs) may require a specialized deployment because of environmental or QoS factors, for example. Generally, such specialized connections are made using expensive, highly specialized optical or coax-based, time-division multiplexing (TDM) architectures. As the coverage radius of RE decreases, the expected traffic load from any particular RE site diminishes, the number of RE sites increases, and conventional point-to-point methods of interconnection become economically undesirable.

A distributed antenna architecture is an evolving alternative to such conventional architectures. A distributed antenna architecture can provide a network of spatially separated antenna nodes (e.g., REs 110-119) connected to a common controller (e.g., REC 105) via a transport medium that provides wireless service within a geographic area or structure. Radio signals to and from the common controller can be passed through a system of multiple antennas. There are a number of different types of distributed antenna architectures, each with their own characteristics. Passive DAA, for example, may be characterized by combining radio signals with passive components such as filters, splitters, and couplers. Active DAA is another example in which radio signals may be converted and distributed over fiber links. In yet another example, hybrid DAA may combine features of passive DAA and active DAA. Distributed antenna architectures may be particularly advantageous within a building or across a large urban area. In a large urban area, for example, street-level DAA can provide a very efficient solution for large urban regeneration projects that may require dense coverage. They can also be provided in other busy areas such as airports or other mass transit hubs.

In some distributed antenna architectures, such as a cloud radio access network (CRAN) architecture, radio-processing functions may be centralized to resolve some power efficiency and resource utilization concerns with many intelligent radio/cell-site architectures. In general, a CRAN architecture provides a remote radio head (such as REs 110-119) placed in close proximity to an antenna (or may be integrated with an antenna). A remote radio head can translate a radio signal into a digital bit stream, which can travel greater distances without loss. The digital signals from a remote radio head can be transmitted over a fronthaul to a centralized baseband processing unit, which effectively shifts processing from the antenna and allows operators to pool and share processor bandwidth across remote radio heads. A controller (e.g., an REC, a base station controller, radio network controller, etc.) may also be co-located with the baseband processing to aggregate from cell sites and manage the radio access network.

The controller generally provides the network interface transport, radio base station control and management, and digital baseband processing, whereas the remote radio head can provide the analog radio frequency functions, such as filtering, modulation, frequency conversion, and amplification. The functional split between both parts is done in such a way that a generic interface based on In-phase and Quadrature (IQ) data can be defined.

CRAN can also reduce the number of cell sites, while increasing the base station deployment density. By making a remote radio head an active unit capable of converting from analog to digital, operators can place numerous controllers in a single geographical point, while distributing radio heads according to the radio frequency (RF) plans. Active electronics of multiple cell sites can be centralized at one location, thereby reducing energy, real estate, and security costs. Radio heads can be mounted outdoor or indoor—on poles, sides of buildings or anywhere a power and a broadband connection exist, making installation less costly and easier. The remote radio heads become an intelligent antenna array, which not only can submit radio signals but can also handle the conversion between digital and analog data. A remote radio head can also support multiple cellular generations (e.g., 2G, 3G, and LTE) eliminating the need for multiple antennas.

In an evolved UMTS Terrestrial Radio Access Network (E-UTRAN), for example, the controller can provide access to the Evolved Packet Core for the transport of user-plane and control-plane traffic via the S1 interface, whereas a remote radio head can serve as the air interface to the user equipment. In another example, a controller can provide access to network entities (e.g. other base stations or an access service network-gateway (ASN-GW)) in a WiMAX network, whereas the radio head can serve as the air interface to the subscriber station/mobile subscriber station (SS/MSS).

Common Public Radio Interface (CPRI) is a standard for transporting digital radio signal streams (i.e., radio signals converted to a digital bit stream) in a CRAN architecture over a link between a remote radio head and a baseband processing unit. In more general CPRI terms, a remote radio head is commonly referred to as radio equipment (RE), and a baseband processing unit and/or controller is referred to as radio equipment control (REC). User-plane data, control and management (C&M) data, and synchronization signals can be exchanged between the REC and the RE. Flows can be multiplexed onto a digital serial communication line using appropriate layer 1 and layer 2 protocols. The different information flows can access layer 2 via appropriate service access points. CPRI may also be used as a link between two nodes in system architectures supporting networking.

In general terms, CPRI provides a basic protocol hierarchy with functions running at Layer 1 (i.e., electrical or optical transmission and time-division multiplexing (TDM)), and Layer 2. Layer 2 can include In-Phase and Quadrature (IQ) data, vendor-specific information, Ethernet, High-level Data Link Control (HDLC), L1 Inband Protocol, control and management (C&M) data, and synchronization. A basic layer 1 frame of CPRI generally consists of sixteen words, the length of which depends on the CPRI line bit rate. The first word is used as a control word, which is transmitted first. The control word can identify the type of stream (e.g., user plane, C&M, synchronization) and the number of sub-streams carried within the stream. Hence, the term "word" represents broad terminology inclusive of any type of identifier, symbol, electronic object, signature, etc. that can be associated with a given stream. The stream itself can represent any type of data being propagated between two points.

Other architectures, protocols, and interfaces may also provide for transporting digital radio signal streams over a link between a remote radio head and a baseband processing unit or controller. Femtocells, for example, may be particularly advantageous in specialized spaces, including indoors. A common femtocell interface may be provided between radio frequency functions and baseband processing to enable interoperability of components from different manufacturers. One such standard (commonly referred as the Femtocell Application Programming Interface or FAPI) has been proposed that includes a security coprocessor interface, a service discovery interface, a GPS interface, a network listen results interface, a PHY mode control interface, a ciphering coprocessor interface, a main data path interface, and a scheduler interface.

The Open Base Station Architecture Initiative (OBSAI) is another example of a family of specifications that provides the architecture, function descriptions, and minimum requirements for integration of a set of common modules into a base transceiver station (BTS). As a minimum, the BTS can be configured from a set of common modules in order to support one or more current or future wireless network access standards. The technical requirements contained in the OBSAI family of specifications form an interface specification to ensure compatibility and interoperability among and between the set of common modules.

Yet other examples include a standard from VME International Trade Association (VITA 49) and the Open Radio Equipment Interface (OREI). VITA 49 is an interconnect standard for passing intermediate frequency (IF) data between analog front-ends and digital signal processor subsystems in a digital, link-agnostic format. OREI is defined by the Industry Specification Group as a method for standardizing the communications interface of distributed radio equipment for mobile communication networks. In general, OREI covers those layers of a network stack required to enable interoperability, and may be built on other publicly available specifications, including CPRI.

While distributed antenna architectures and radio interfaces may provide many advantages and benefits for fronthaul, the radio interfaces themselves are generally TDM-based Layer 1/Layer 2 protocols. Consequently, implementing such an architecture for fronthaul applications presents significant challenges for integration with packet-based backhaul deployments.

In accordance with embodiments described herein, communication system 100 can overcome these challenges and others by providing a system and method for transporting radio signal streams over a packet-switched network. More particularly, communication system 100 may provide a pseudowire for transporting a digital radio signal stream between a remote radio head and a baseband processing unit (e.g., using Multi-Protocol Label Switching (MPLS) or Layer 2 Tunneling Protocol version 3 (L2TPv3)).

A pseudowire is an emulation of a point-to-point connection over a packet-switched network (PSN). A pseudowire emulates the operation of a "transparent wire" carrying the service. The service being carried over the "transparent wire" may be CPRI, FAPI, OBSAI, VITA 49, OREI, asynchronous transfer mode (ATM), frame relay, Ethernet, TDM, or any other connection-oriented synchronous or plesiochronous links. An example of a pseudowire is described in Request for Comments (RFC) 3985 published by the Internet Engineering Task Force (IETF). A pseudowire may operate over many types of PSNs, including MPLS or L2TPv3 over IP, as well as a user datagram protocol (UDP) over IPv4 or IPv6, MPLS, L2TPv3 over IP, and Ethernet, for example.

In broad terms, MPLS is a routing protocol. More particularly, MPLS is also a highly scalable, protocol agnostic, data-carrying mechanism. In an MPLS network, data packets can be assigned labels. Packet-forwarding decisions can be made solely on the contents of this label, without the need to examine the packet itself. End-to-end circuits can be created across any type of transport medium, using any protocol. MPLS can eliminate dependence on a particular networking model data link layer technology and eliminate the need for multiple layer 2 networks to satisfy different types of traffic. A label distribution protocol (LDP), such as described in IETF RFC 5036, and/or a resource reservation protocol for traffic engineering (RSVP-TE), such as described in IETF RFC 3209, may be used for pseudowire setup. Moreover, MPLS can also integrate operations, administration, and management (OAM) with the pseudowire, which may be particularly advantageous for diagnosing remote connections end-to-end.

MPLS operates at a layer that is generally considered to lie between traditional definitions of layer 2 (data link layer) and layer 3 (network layer), and thus is often referred to as a "layer 2.5" protocol. It can provide a unified data-carrying service for both circuit-based clients and packet-switching clients that provide a datagram service model. It can be used to carry many different kinds of traffic, including Internet Protocol (IP) packets, as well as native ATM, synchronous optical networking (SONET), and Ethernet frames.

L2TP is an encapsulation technique that allows packets to be transported between a pair of endpoints inside IP packets. L2TPv3 is an IETF standard (see RFC 3931) related to L2TP that can be used as an alternative to MPLS for encapsulation of multiprotocol Layer 2 communications traffic over IP networks. Like L2TP, L2TPv3 provides a pseudowire service, but scaled to fit carrier requirements. L2TPv3 can also provide end-to-end encryption, which avoids the need to separately encrypt each radio signal stream.

In certain example embodiments, a wireless access point may be configured as a remote radio head (e.g., an RE) in a distributed antenna architecture, such as CRAN, using various radio interface specifications to transport digital radio signal streams over a pseudowire between the wireless access point and radio equipment control (e.g., a baseband processing unit or controller). A signal stream does not necessarily have channelization, framing, or other timing structures, such that it can include unstructured synchronous serial data, as well as structured synchronous data. Thus, for example, wireless access points such as REs 110-119 in communication system 100 may receive radio signal streams from endpoints and transport them to a centralized baseband-processing unit or controller, such as REC 105, using CPRI over an MPLS or L2TPv3 pseudowire. Such endpoints may be associated with subscribers, clients, or customers wishing to access communication system 100, for example.

The term "endpoint" or "node" may be inclusive of devices used to initiate a communication, such as a computer, any type of user equipment, any type of mobile station, any type of smart phone, a personal digital assistant (PDA), a laptop or electronic notebook, a cellular telephone, an iPhone, an iPad, a Google Android phone, an Internet Protocol (IP) phone, or any other device, component, element, or object capable of initiating voice, audio, or data exchanges within communication system 100. Endpoints may also be inclusive of a suitable interface to the human user, such as a microphone, a display, or a keyboard or other terminal equipment.

Endpoints may also be any device that seeks to initiate a communication on behalf of another entity or element, such as a program, a database, or any other component, device, element, or object capable of initiating a voice or a data exchange within communication system 100. Data, as used herein, refers to any type of numeric, voice, or script data, or any type of source or object code, or any other suitable information in any appropriate format that may be communicated from one point to another.

Figure 2:
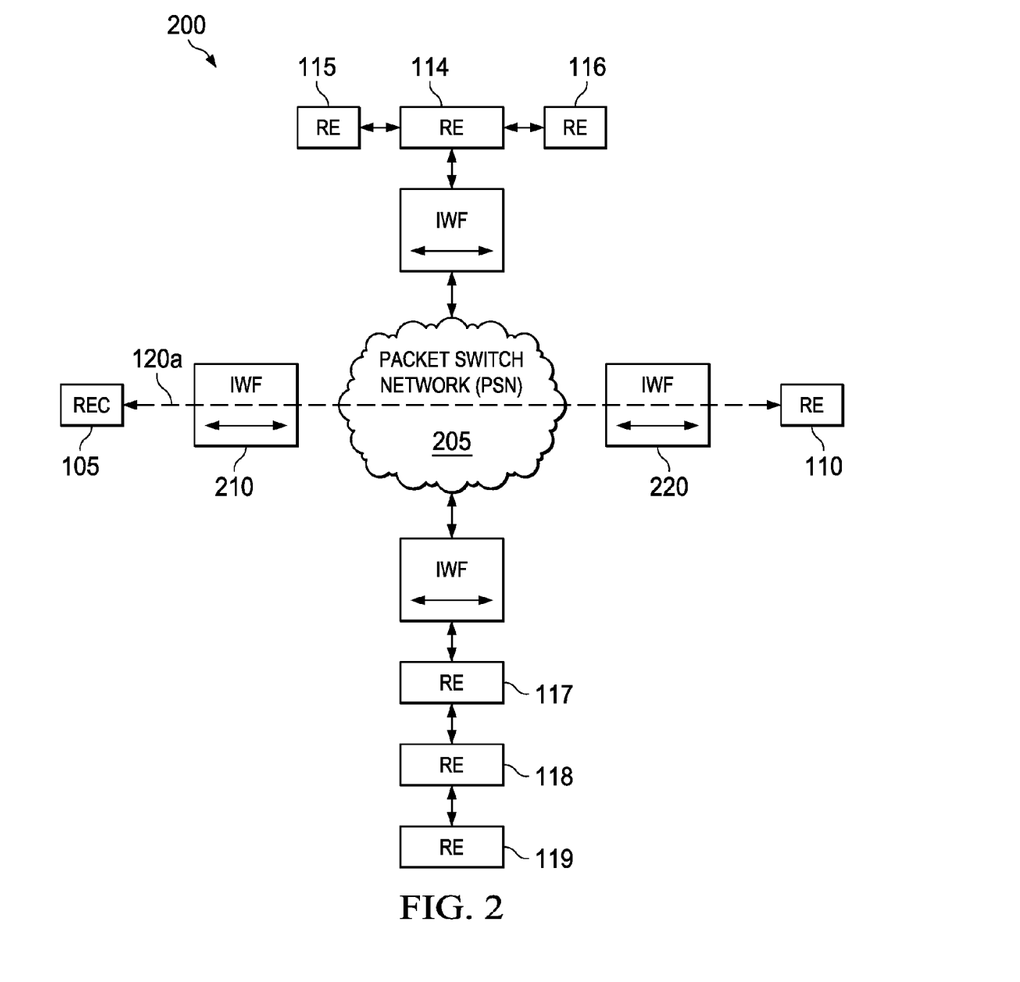
FIG. 2 is a simplified functional block diagram illustrating additional details that may be associated with example embodiments of the communication system.

FIG. 2 is a simplified functional block diagram 200 illustrating additional details that may be associated with example embodiments of communication system 100. In FIG. 2, REC 105 is connected to RE 110 through pseudowire 120a. REC 105 may also be connected to other REs, such as REs 114-119 through a PSN 205. An interworking function (IWF) 210 and an IWF 220 can encapsulate and decapsulate radio signal streams to/from REC 105 and RE 110, respectively, while simultaneously encapsulating and decapsulating packetized data to/from PSN 205. IWFs 210-220 may be coupled with or integral to REC 105 and RE 110, respectively.

Figure 3:
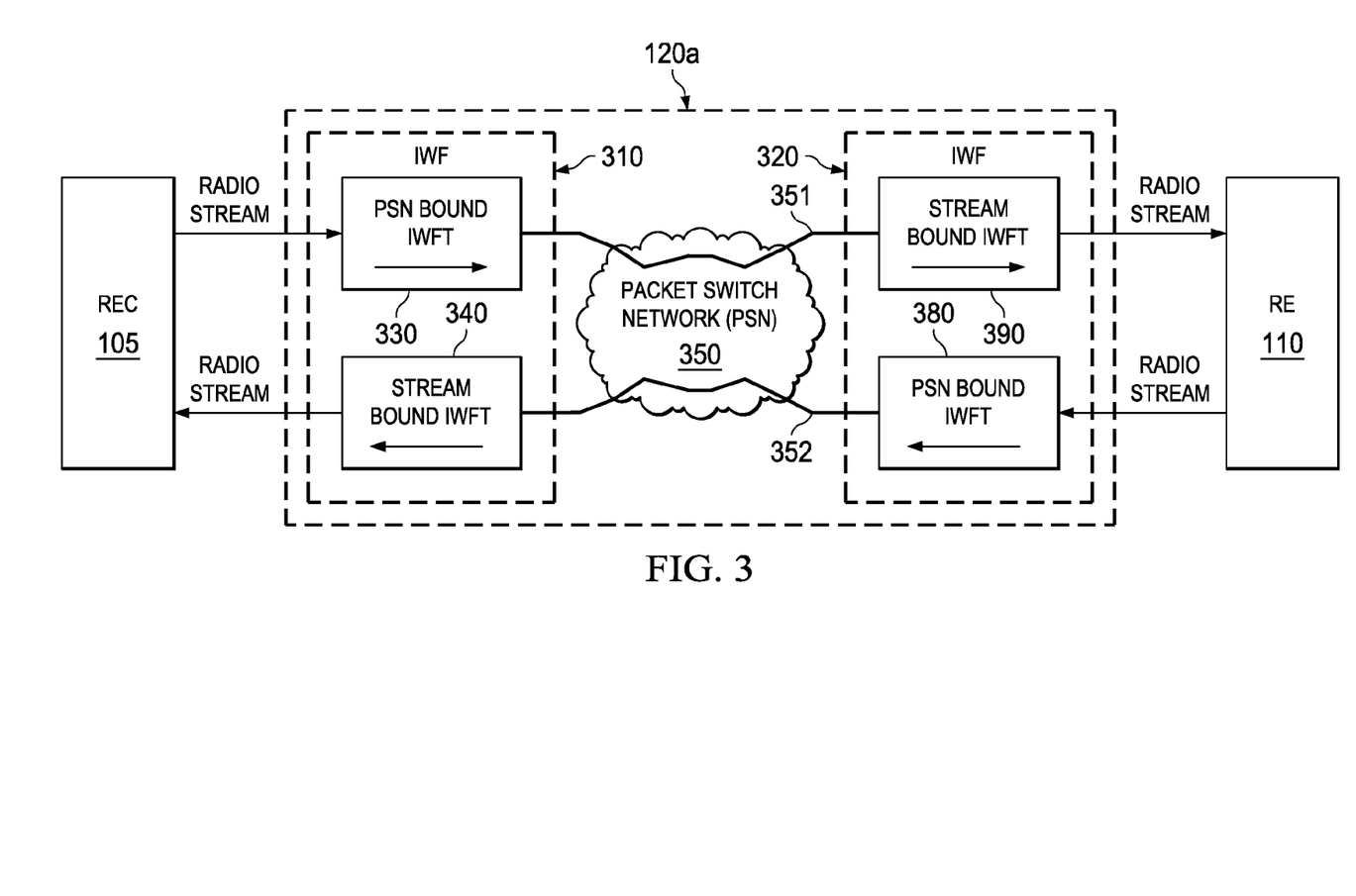
FIG. 3 is a simplified functional block diagram that illustrates additional details that may be associated with certain example embodiments the communication system.

FIG. 3 is a simplified functional block diagram 300 that illustrates additional details that may be associated with certain example embodiments of communication system 100. More particularly, FIG. 3 illustrates additional details that may be associated with a pseudowire such as pseudowire 120a in communication system 100. In this embodiment, pseudowire 120a may comprise a pair of IWFs 310-320 and PSN 205 to create a bidirectional virtual circuit. A PSN-bound IWFT 330 may create a tunnel 351 (e.g., an MPLS or a L2TPv3 tunnel) through PSN 205 to a stream-bound IWFT 390. A PSN-bound IWFT 380 may independently create a tunnel 352 through PSN 205 to a stream-bound IWFT 340. In some embodiments, PSN-bound IWFT 330 may be connected to an ingress router of PSN 205, while in other example embodiments IWFT 330 may be integrated with (or coupled to) radio equipment, such as REC 105. IWFT 340 may be connected to an egress router of PSN 205, or may also be integrated with (or coupled to) radio equipment, for example. PSN-bound IWFT 380 may also be connected to an ingress router of PSN 205, or may be integrated with (or coupled to) radio equipment, such as RE 110. IWFT 390 may be connected to an egress router of PSN 205, or may be integrated with (or coupled to) radio equipment.

In some example implementations, REC 105, REs 110-119, IWFs 210-220, and/or other elements of communication system 100 are network elements, which are meant to encompass network appliances, servers, routers, switches, gateways, bridges, load balancers, firewalls, base stations, access points, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In regard to the internal structure associated with elements of communication system 100, REC 105, REs 110-119, IWFs 210-220, and/or other elements can include memory elements for storing information to be used in the operations outlined herein. Each of REC 105, REs 110-119, IWFs 210-220, and/or other elements may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein should be construed as being encompassed within the broad term "memory element." The information being used, tracked, sent, or received by REC 105, REs 110-119, IWFs 210-220, and/or other elements could be provided in any database, register, queue, table, cache, control list, or other storage structure, all of which can be referenced at any suitable timeframe. Any such storage options may be included within the broad term "memory element" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. This includes the memory elements being able to store software, logic, code, or processor instructions that are executed to carry out the activities described herein.

In one example implementation, REC 105, REs 110-119, IWFs 210-220, and/or other elements may include firmware and/or software modules to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, REC 105, REs 110-119, IWFs 210-220, and/or other elements may include a processor that can execute software or an algorithm to perform activities as discussed herein. A processor can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 4:
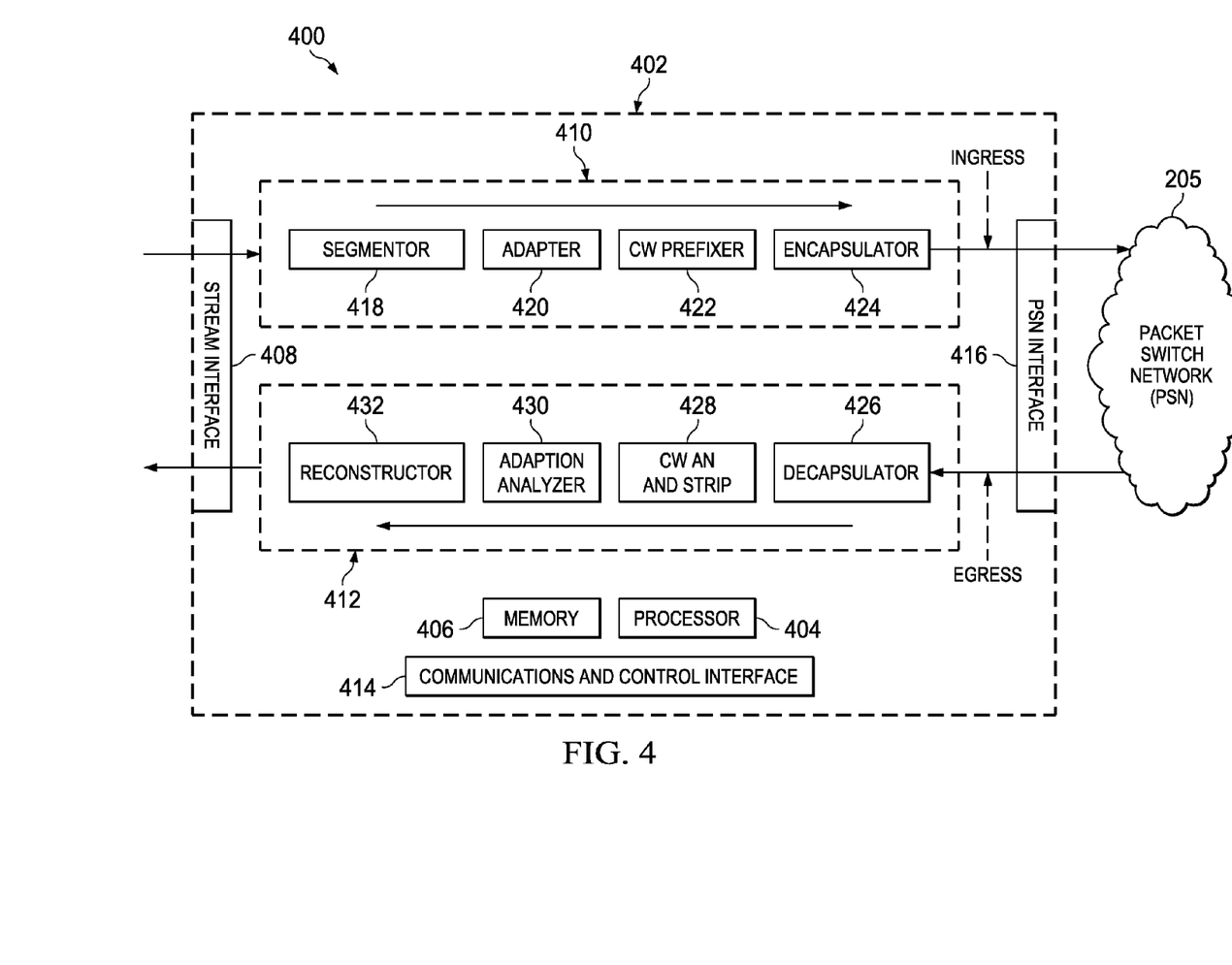
FIG. 4 is a simplified functional block diagram that illustrates additional details that may be associated with example embodiments of an interworking function in the communication system.

FIG. 4 is a simplified functional block diagram 400 that illustrates additional details that may be associated with example embodiments of an IWF in communication system 100. A bi-directional IWF 402 includes a processor 404 and a memory element 406, and may also include additional hardware, firmware, and/or software elements, such as a stream interface 408, a PSN-bound IWFT 410, a stream-bound IWFT 412, a communications and control interface 414, and a PSN interface 416. Hence, appropriate software, firmware, and/or hardware may be provisioned in IWF 405 to facilitate the activities discussed herein. IWFTs 410-412 may share resources in some embodiments, including processor 404 and memory element 406, and may have a common communications and control interface (e.g., communications and control interface 414). In other example embodiments, IWFTs 410-412 may have any combination of dedicated elements. IWF 402 may interface with a PSN such as PSN 205.

In this example, IWFT 410 includes a stream segmentor 418, a stream adapter 420, a control word prefixer 422, and an encapsulator 424 operating in the ingress direction of PSN 205. Segmentor 418 can parse an incoming contiguous stream into finite sized data segments suitable in size to be encapsulated into a packet payload. In this example embodiment, stream adapter 420 may provide data to assist in timing recovery and recovery from packet loss and to ensure proper transfer of stream signaling. Control word prefixer 422 may prepend to a segment (post adaption) a control word that helps identify the order in which segments should be reassembled by a reconstructor at the other end of a unidirectional downstream path. Encapsulator 424 may encapsulate the payload data with a network header, such as an IP header, and a pseudowire header, such as an MPLS or L2TPv3 header.

IWFT 420 may include a decapsulator 426, a control word analyzer and stripper 428, a stream adaption analyzer 430, and a reconstructor 432 operating in the egress direction of PSN 205. Decapsulator 426 may be used to analyze and remove network and pseudowire headers (e.g., IP/MPLS or IP/L2TPv3 headers). Control word analyzer and stripper 428 can strip control words and reorder the arriving stream payloads so they can be appropriately ordered (e.g., into a contiguous stream). Stream adaption analyzer 430 may analyze and strip adaption data so that the proper timing and packet loss recovery modes of the stream can be implemented. Reconstructor 432 can reconstruct the stripped and ordered payloads into a contiguous stream.

Figure 5:
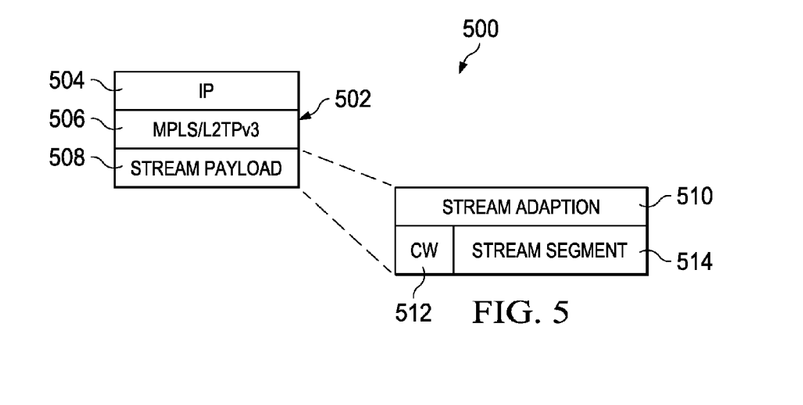
FIG. 5 is a simplified stack diagram that illustrates potential details that may be associated with a packet format in example embodiments of the communication system.

FIG. 5 is a simplified stack diagram 500 that illustrates details that may be associated with a packet format in example embodiments of communication system 100. Packet 502 generally includes PSN-specific headers and a stream payload. PSN-specific headers provide information for forwarding packet 502 from a PSN-bound IWFT to a stream-bound IWFT. PSN-specific headers may be headers for UDP/IP, L2TPv3/IP, MPLS, or layer 2 Ethernet, for example. In the example of packet 502, the PSN-specific headers include network layer headers 504 (e.g., IP headers) and pseudowire headers 506 (e.g., MPLS or L2TPv3). An IWF may simultaneously support multiple pseudowires, and the IWF may maintain context information for each pseudowire. Pseudowires can be differentiated based on pseudowire labels, which can be carried in pseudowire headers 506, for example. Stream data may be modified in a stream payload 508, which may include a stream adaption 510, a control word 512, and a stream segment 514, for example.

Figure 6:
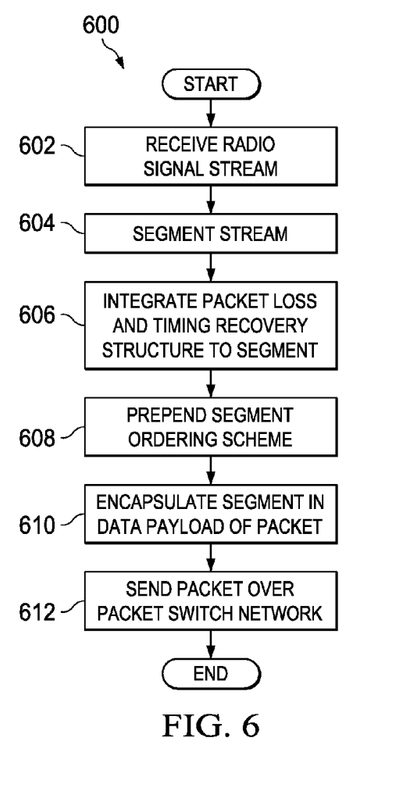
FIG. 6 is a simplified flow diagram illustrating potential operations that may be associated with example embodiments of the communication system.

FIG. 6 is a simplified flow diagram 600 illustrating potential operations that may be associated with example embodiments of communication system 100. In some embodiments, these operations may be associated with a PSN-bound IWFT (e.g., IWFT 410) in a radio element, such as REC 105 or RE 110, for example. In other embodiments such operations may be implemented in other network elements, such as a router, switch, etc., or as an independent network appliance. In other embodiments the operations may be distributed among various network elements.

A radio signal stream may be received at 602 and parsed into segments at 604, suitable in size to be encapsulated into a packet payload. Packet loss and timing recovery data may be integrated into the segments at 606. A control word may be prepended to a segment at 608, which can identify the order in which segments should be reassembled by a reconstructor at the other end of a downstream path. At 610, segments may be encapsulated with a network header, such as an IP header, and a pseudowire header, such as an MPLS or L2TPv3 header. The packetized segments may then be transported over a PSN at 612, to another radio element, for example.

Figure 7:
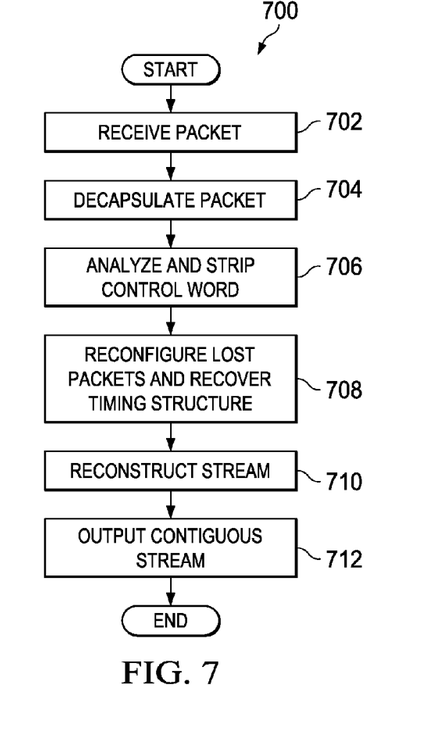
FIG. 7 is a simplified flow diagram illustrating other potential operations that may be associated with example embodiments of the communication system.

FIG. 7 is a simplified flow diagram 700 illustrating potential operations that may be associated with example embodiments of communication system 100. In some embodiments, these operations may be associated with a stream-bound IWFT (e.g., IWFT 412) in a radio element, such as REC 105 or RE 110, for example. In other embodiments such operations may be implemented in other network elements, such as a router, switch, etc., or as an independent network appliance. In other embodiments the operations may be distributed among various network elements.

A packet carrying a radio signal stream segment may be received at 702. Network and pseudowire headers may be analyzed and removed at 704. Control words can be stripped and payloads reordered at 706 so they can be appropriately ordered into a contiguous stream. Adaption data may be analyzed and stripped at 708 so that the proper timing and packet loss recovery modes of the stream can be implemented. The stripped and ordered payloads can be reconstructed into a contiguous stream at 710 and transmitted at 712.

Embodiments of communication system 100 may provide significant advantages, some of which have already been discussed. For example, embodiments of communication system 100 can be deployed as a fronthaul using networking elements common in IP backhaul networks. Communication system 100 can support geographical distribution of controllers and radio equipment, and allow operators to deploy distributed antenna architectures over PSNs, while reducing manufacturing and deployment expense. Further, communication system 100 may also allow small cells to be tightly integrated into mobile carrier networks, with a common cloud-based signal processing system.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures. Additionally, although described with reference to particular scenarios, where a particular module, such as a participation level module, is provided within a network element, these modules can be provided externally, or consolidated and/or combined in any suitable fashion. In certain instances, such modules may be provided in a single proprietary unit.

It is also important to note that the operations in the appended diagrams illustrate only some of the possible signaling scenarios and patterns that may be executed by, or within, communication system 100. Some of these operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a first radio signal stream;
   segmenting the first radio signal stream into first segments;
   integrating, into one of the first segments of the first radio signal stream, packet loss recovery data;
   prepending a control word to the one of the first segments of the first radio signal stream;
   encapsulating the one of the first segments of the first radio signal stream with a network header to produce a packet from the one of the first segments of the first radio signal stream, the packet loss recovery data, the control word, and the network header; and
   transporting the packet over a first pseudowire in a packet-switched network.

2. The method of claim 1, wherein the first pseudowire is a multi-protocol label switching pseudowire.

3. The method of claim 1, wherein the first pseudowire is a layer 2 tunneling protocol pseudowire.

4. The method of claim 1, wherein the first radio signal stream is received using a common public radio interface.

5. The method of claim 1, wherein the first radio signal stream is received using a femtocell application programming interface.

6. The method of claim 1, wherein the one of the first segments includes timing recovery data, and the control word identifies an order in which the first segments can be reassembled.

7. The method of claim 1, further comprising:
parsing the one of the first segments into a predetermined size, wherein the control word identifies an order in which the first segments can be reassembled into a contiguous stream.

8. Logic encoded in one or more non-transitory media that includes code for execution and, when executed by one or more processors, is operable to perform operations comprising:
receiving a radio signal stream;
segmenting the radio signal stream into segments;
integrating, into one of the segments of the radio signal stream, packet loss recovery data;
prepending a control word to the one of the segments of the radio signal stream;
encapsulating the one of the segments of the radio signal stream with a network header to produce a packet from the one of the segments of the radio signal stream, the packet loss recovery data, the control word, and the network header; and
transporting the packet over a pseudowire in a packet-switched network.

9. The encoded logic of claim 8, wherein the pseudowire is a multi-protocol label switching pseudowire.

10. The encoded logic of claim 8, wherein the pseudowire is a layer 2 tunneling protocol pseudowire.

11. The encoded logic of claim 8, wherein the radio signal stream is received using a common public radio interface.

12. The encoded logic of claim 8, wherein the radio signal stream is received using a femtocell application programming interface.

13. The encoded logic of claim 8, wherein the one of the segments includes timing recovery data, and the control word identifies an order in which the segments can be reassembled.

14. The encoded logic of claim 8, the operations further comprising:
parsing the one of the segments into a predetermined size, wherein the control word identifies an order in which the segments can be reassembled into a contiguous stream.

15. An apparatus, comprising:
one or more processors operable to execute instructions such that the apparatus is configured to
receive a radio signal stream through a stream interface;
segment the radio signal stream into segments;
integrate, into one of the segments of the radio signal stream, packet loss recovery data;
prepend a control word to the one of the segments of the radio signal stream;
encapsulate the one of the segments of the radio signal stream with a network header to produce a packet from the one of the segments of the radio signal stream, the packet loss recovery data, the control word, and the network header; and
transport the packet through a packet-switched network interface over a pseudowire in a packet-switched network.

16. The apparatus of claim 15, wherein the pseudowire is a multi-protocol label switching pseudowire.

17. The apparatus of claim 15, wherein the pseudowire is a layer 2 tunneling protocol pseudowire.

18. The apparatus of claim 15, wherein the radio signal stream is received using a common public radio interface.

19. The apparatus of claim 15, wherein the radio signal stream is received using a femtocell application programming interface.

20. The apparatus of claim 15, wherein the apparatus is further configured to parse the one of the segments into a predetermined size, and the control word identifies an order in which the segments can be reassembled into a contiguous stream.

21. The method of claim 1, further comprising:
receiving second segments in packets through a packet-switched network interface over a second pseudowire in the packet-switched network;
reconstructing a second radio signal stream from the second segments; and
transporting the second radio signal stream as a contiguous stream through a stream interface, wherein the first radio signal stream is received through the stream interface.

* * * * *